Dec. 30, 1924.
C. C. FARMER
PIPE SUPPORTING DEVICE
Filed Aug. 21, 1920
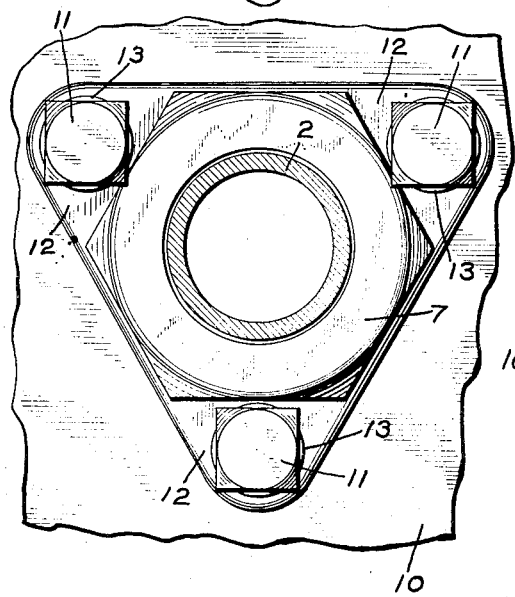
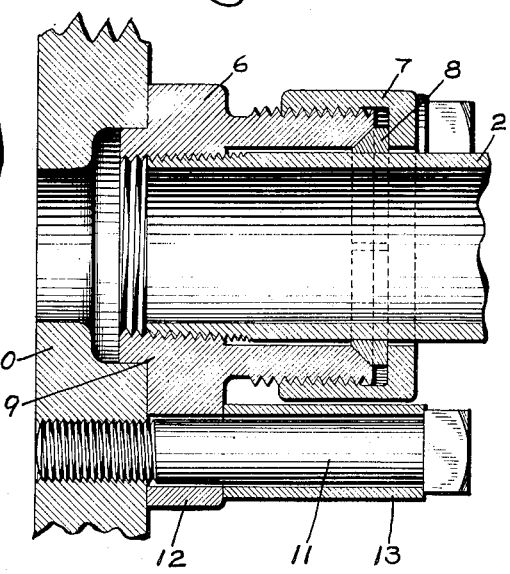
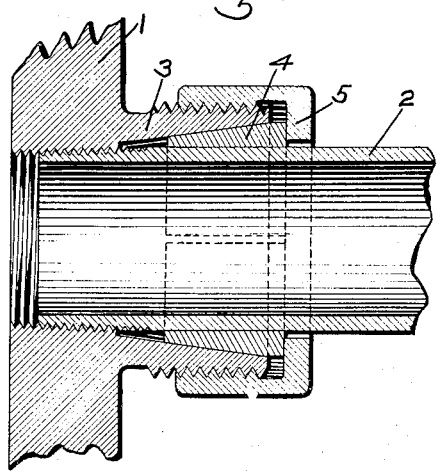
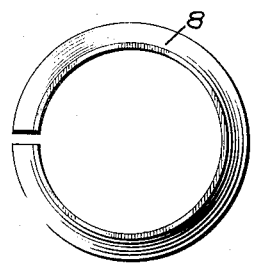
INVENTOR
CLYDE C. FARMER
BY Wm. M. Cady
ATTORNEY Patented Dec. 30, 1924.

1,520,705

UNITED STATES PATENT OFFICE.

CLYDE C. FARMER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

PIPE-SUPPORTING DEVICE.

Application filed August 21, 1920. Serial No. 405,183.

*To all whom it may concern:*

Be it known that I, CLYDE C. FARMER, a citizen of the United States, residing at Edgewood, in the county of Allegheny and State of Pennsylvania, have invented new and useful Improvements in Pipe-Supporting Devices, of which the following is a specification.

This invention relates to pipe supporting devices and the principal object of my invention is to provide a support for a pipe having screw threaded connection with a connecting member.

In the accompanying drawing; Fig. 1 is a sectional view of a pipe screwed into a connecting member, and showing my invention applied thereto; Fig. 2 a central sectional view illustrating a modified form of my invention; Fig. 3 a face view of the construction shown in Fig. 2; and Fig. 4 a detail view of the clamping ring employed in the Fig. 2 construction.

In Fig. 1 is shown a member 1 into which a pipe 2 is screwed and according to one form of my invention, the member 1 is provided with an exteriorly threaded sleeve section 3 through which the pipe 2 extends. The interior of the sleeve section 3 is tapered to receive a correspondingly tapered clamping ring 4, which is split and is adapted to engage the pipe 2, as shown.

A flanged nut 5 engages the screw threads on the sleeve section 3 and by screwing up the nut, the ring 4 is forced into tight clamping engagement with the pipe.

By supporting the pipe at a point distant from the screw threads, the threaded portion of the pipe is protected from strain and vibration tending to loosen the pipe threads and also lessens the possibility of the pipe breaking where the pipe threads may be exposed.

According to the modified form shown in Figs. 2 and 3, the pipe 2 is screwed into a flanged body 6, having exterior screw threads for a flanged nut 7.

A wedge or clamping ring 8 having a tapered face is interposed between the nut 7 and the body 6, so that when the nut is screwed up, the ring 8 will firmly clamp the pipe 2 and thus support the pipe at a point distant from the screw threads.

The body 6 is provided with an annular boss 9 adapted to fit into a recess in the connecting member 10 and the body is secured to said member by bolts 11, extending through holes in flanges 12, the bolt heads being spaced from the flanges by thimbles 13 which serve to lock the nut 7 against rotation, when the parts are in place.

As in the Fig. 1 construction, the pipe 2 is supported, so that strain is taken off the screw threads, which prevents vibration tending to loosen the threads and also reduces the liability of the pipe breaking at the threads.

Having now described my invention, what I claim as new and desire to secure by Letters Patent, is:—

1. The combination with a section of pipe having a screw-threaded end, of a member with which said pipe communicates, a sleeve rigidly secured to said member by a metal to metal joint in which sleeve said pipe has pipe-screw-threaded engagement, a hard metal clamping ring for engaging the pipe to support same at a point remote from the screw-threaded end, and a nut having screw-threaded engagement with said sleeve for pressing said ring into rigid clamping engagement with said pipe.

2. The combination with a section of pipe having a screw-threaded end, of a member with which said pipe communicates, a sleeve rigidly secured by a metal to metal joint to said member in which sleeve said pipe has pipe-screw-threaded engagement, a hard metal clamping ring having a wedge face for engaging a corresponding face in the sleeve at a point removed from the screw-threaded end of the pipe and adapted to engage the pipe section, and a nut having screw-threaded engagement with said sleeve for clamping said ring against the pipe section.

In testimony whereof I have hereunto set my hand.

CLYDE C. FARMER.